United States Patent
Rick et al.

(10) Patent No.: US 6,552,648 B1
(45) Date of Patent: Apr. 22, 2003

(54) METHOD FOR PROTECTING HIRE VEHICLES AGAINST UNAUTHORIZED USE

(75) Inventors: Thomas Rick, Backnang (DE); Peter Wagner, Remshalden (DE); Siegleif Lenart, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/614,930

(22) Filed: Mar. 11, 1996

(30) Foreign Application Priority Data

Mar. 10, 1995 (DE) ........................................ 195 08 370

(51) Int. Cl.⁷ ............................................. G05B 19/00
(52) U.S. Cl. ..................... 340/5.1; 340/5.31; 340/5.8; 340/5.61; 340/426; 340/825.49; 307/10.2; 180/287; 342/357.07; 342/357.09
(58) Field of Search ................... 340/825.31, 825.34, 340/825.54, 5.1, 5.31, 5.8, 5.61, 426, 825.49; 342/450, 456, 457, 357, 357.07, 357.09; 364/424.01, 424.03, 424.04; 235/382, 382.5; 307/10.2; 180/287

(56) References Cited

U.S. PATENT DOCUMENTS

| | | | | |
|---|---|---|---|---|
| 5,223,844 A | * | 6/1993 | Mansell et al. ............. | 342/357 |
| 5,381,128 A | * | 1/1995 | Kaplan ....................... | 340/426 |
| 5,459,448 A | * | 10/1995 | Dortenzio et al. .......... | 340/426 |
| 5,550,551 A | * | 8/1996 | Alesio ......................... | 342/457 |

FOREIGN PATENT DOCUMENTS

| | | |
|---|---|---|
| DE | 42 24 536 | 1/1994 |
| DE | 43 20 174 | 12/1994 |
| DE | 44 15 052 | 11/1995 |
| DE | 4440975 | 5/1996 |
| EP | 377816 | 7/1990 |
| EP | 451482 | 10/1991 |
| EP | 0 680 859 | 11/1995 |
| EP | 712768 | 5/1996 |
| GB | 2271000 | 3/1994 |
| JP | 150853 | 7/1986 |
| JP | 147998 | 6/1989 |
| NL | 9202255 | 7/1994 |

OTHER PUBLICATIONS

"Satellitenhilfe gegen Auto–Klua," R. Gramm, Funkschau, 16/1993, pp. 42–45.

* cited by examiner

Primary Examiner—Michael Horabik
Assistant Examiner—Yves Dalencourt
(74) Attorney, Agent, or Firm—Crowell & Moring LLP (57) ABSTRACT

In a method of protecting against unauthorized use of a vehicle having a communication structure for exchange of data between a receiving unit, a use protection and control unit and at least one operationally essential system control, a master station broadcasts a signal defining use restrictions applicable to the vehicle, and the use protection and control unit aboard the vehicle checks for violation of the use restrictions, and disables the at least one operationally essential system control if a violation is detected.

24 Claims, 5 Drawing Sheets

METHOD FOR PROTECTING HIRE VEHICLES AGAINST UNAUTHORIZED USE

BACKGROUND AND SUMMARY OF THE INVENTION

The invention relates to a method for protecting vehicles (particularly leased or hire vehicles), against unauthorized use, by broadcasting a use enabling signal from a stationary master information station.

Such a protection arrangement is disclosed for example in German patent document DE-A 44 40 975.3-51, in which an anti-theft control unit and a receiving device of a mobile communication system are arranged in the vehicle. A communication structure aboard the vehicle permits, on the one hand, the exchange of data between an anti-theft control unit and the receiving device and, on the other hand, the exchange of data between the anti-theft control unit and at least one operationally necessary control unit of the vehicle. As long as a vehicle has not been reported stolen, or provided another unauthorized use of the vehicle has not been determined, signals are transmitted from a master station to the vehicle via the mobile communication system at regular time intervals, the said signals being received by the receiving device. The reception of the signals is conveyed from the receiving device to the anti-theft control unit via the communication structure. The signals are detected and if they are determined to be directed at the vehicle, operation of the vehicle is enabled for a prescribed time period interval between two which is longer than the time successive signals. If no signal is received before expiration of the period for which operation of the vehicle is enabled, the enabling of operation of the vehicle is not prolonged. The anti-theft control unit then actuates the at least one operationally necessary control unit via the communication structure and prevents the further operation of this control unit, at least at the next attempt to activate the vehicle.

This measure prevents a vehicle from being used without authorization over a relatively long period of time. Also, operation is not dependent on signals which are emitted by the vehicle and may be disrupted, but is instead dependent exclusively on reception of the signals broadcast by the master station so that disruption or destruction of the communication system does not permit prolonged use of the vehicle.

A disadvantage of this method is that it does not enable a location of the vehicle. As a result, it is still possible, for example after misappropriating the vehicle, to transfer it to another location on a transporter, without risk. In addition, a relatively long period of time may pass between the time when the unauthorized use of the vehicle starts and the time when the information relating to the unauthorized use is conveyed to the master station, so that broadcasting of the signals may not commence until a considerable period of time after the unauthorized use has started. During this period of time, the unauthorized use of the vehicle can be continued unhindered. In addition, if a large number of vehicles are to be protected in this manner, a very large transmission capacity is required for the signals which are broadcast at regular time intervals. Therefore, this method is suitable only for protecting a strictly limited number of vehicles.

Furthermore, it is known for example from the article "Satellitenhilfe gegen Auto-Klau" [Using satellites to combat car theft] by R. Gramm in the journal Funkschau Issue 16/1993 pp. 42 to 45 to provide a locating system which is arranged on the vehicle and determines, continuously or at regular intervals, the geographic area where the vehicle is located, and conveys this information to a master station via a transmitting device aboard the vehicle end. A receiving unit for receiving and evaluating the locating information broadcast by the transmitting device is present in this master station. The location of the vehicle can thus be monitored continuously or at regular intervals in the master station.

This device has the disadvantage that it provides no arrangement for disabling the vehicle. The tracking of the vehicle by the master station can also be prevented, for example, by destroying the transmitting device at the vehicle end or the locating system. In addition, a large capacity in terms of transmitting devices and transmitting frequencies must be made available if a large number of vehicles are to be tracked continuously. If for example a digital radio telephone is used as the mobile communication system, high communication costs are incurred in order continuously to convey the results of the locating of the vehicle to the master station.

German patent document DE 42 24 536 A1 discloses a system for the geographically defined limitation of the area of movement of vehicles. Here, signals are received from satellites by means of a receiver, which signals are converted into position coordinates in the vehicle and compared with defined prescribed values. If a vehicle leaves a previously defined geographic area, a Motronic system which controls the drive system is blocked by means of an evaluation unit and at the same time the current location of the vehicle is transmitted to a control center by means of a transmission unit.

A disadvantage of this arrangement is that the limitation of the area of movement has to be defined in advance, and cannot readily be changed during the period of use. In addition, it is disadvantageous that measures are only taken for the possibility of the vehicle leaving a specific geographical area which may not be adequate for specific applications. Furthermore, no measures are provided to address the possibility that the receiver may be tampered with or destroyed.

German patent document DE 43 20 174 A1, describes a method for protecting operation of a motor vehicle by the authorized user, in which a vehicle transmits a test signal to a master station which replies with a confirmation signal. If the confirmation signal is not received by the vehicle, then, except in specific exceptional cases, an operation disabling device is triggered making operation of the vehicle impossible.

The risk of unauthorized use is particularly great in the case of hire vehicles or leased vehicles as well as in the case of other vehicles which are not used by the owner himself, and also in the case of taxis or lorries.

An object of the invention is to prevent reliably the unauthorized use of a vehicle, in particular of a hire vehicle or leased vehicle.

This object is achieved by the method in accordance with the invention, in which a master station broadcasts a signal defining use restrictions applicable to the vehicle in question. A use protection control unit aboard the vehicle checks for violation of the use restrictions, and disables at least one operationally essential vehicle control system if a violation is detected.

According to another feature of the invention, use of the vehicle is possible only it before the vehicle is handed over (before a journey is begun in the case of taxis and lorries), a bidirectional communication takes place between the vehicle and master station, and takes place at a later time as well. As a result, it is possible not only to transmit exclusively a position message of the vehicle to the master station or to transmit exclusively enabling signals to the vehicle from the master station, but it is also possible to make the communication appropriate to requirements. Before the vehicle is handed over, the use restriction or restrictions applicable to the vehicle must be defined. Operation of the vehicle is not possible until this use restriction is defined.

Other objects, advantages and novel features of the present invention will become apparent from the following detailed description of the invention when considered in conjunction with the accompanying drawings.

DETAILED DESCRIPTION OF THE DRAWINGS

Figure 1:
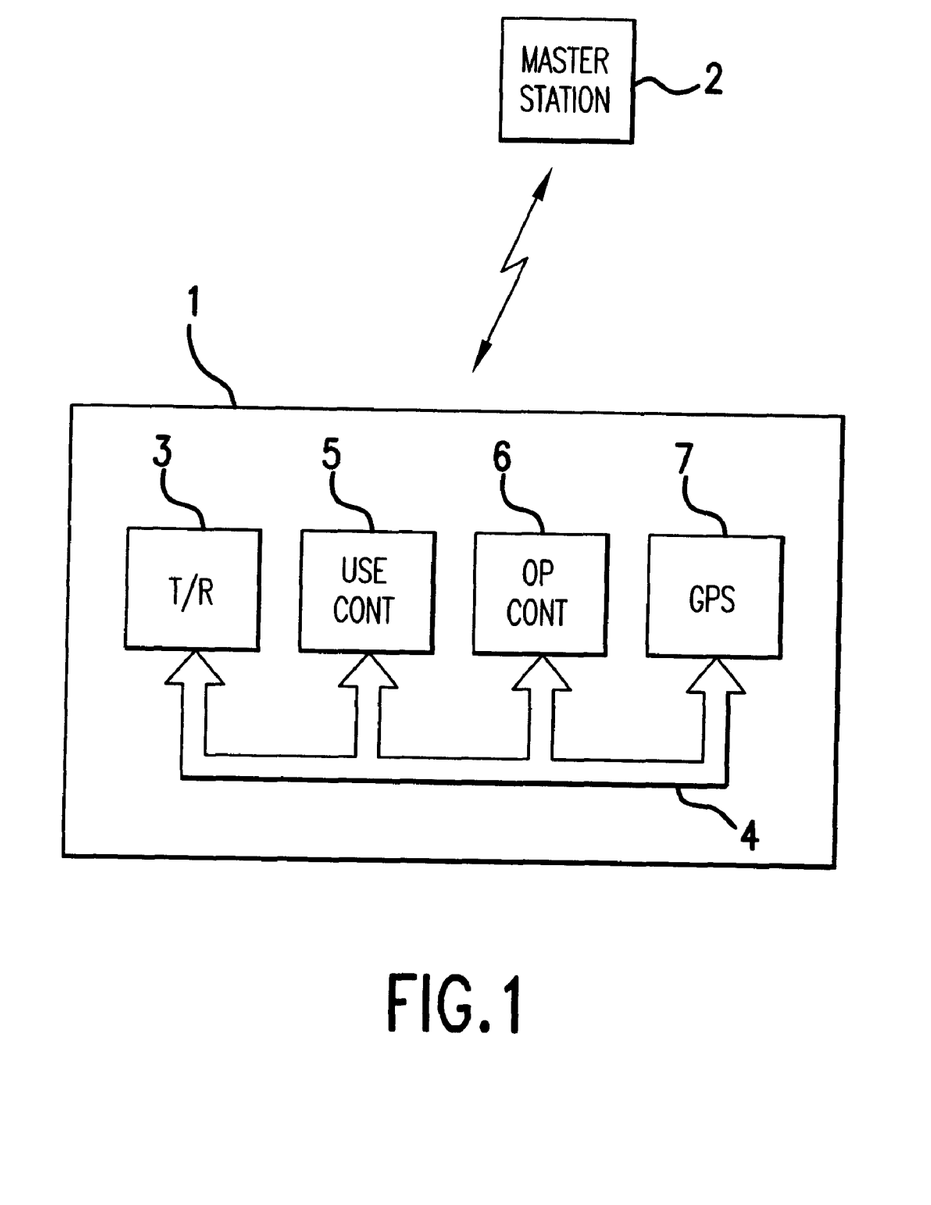
FIG. 1 is a schematic depiction of an arrangement for carrying out the method according to the invention.

FIG. 1 shows an arrangement for carrying out the method according to the invention. A transmitting device and a receiving device, which may be combined in a single unit 1 to form a mobile communication system, are provided for transmitting data between the vehicle 1 and a master station 2. The transmitting device and the receiving device can be combined to form a mobile communication system. This may be for example a mobile telephone which transmits digital data, for example Digital European Cordless Telephones (DECT). The telephone system at the vehicle end must, however, be capable of automatically establishing a connection to the master station. In order to permit the telephone to communicate in the meantime, the set-up connection (any form of exchange of data) must be capable of being carried out with conversations possibly being carried out by vehicle occupants in the background. The transmission of data or of signals between the vehicle and the master station, and vice versa, always occurs here in coded (ciphered etc.) form in order to prevent third parties from being able to broadcast corresponding signals which are interpreted by the master station as coming from a vehicle or by the vehicle as coming from the master station. The signals broadcast by the vehicle and master station must always have a vehicle-specific identification in order to prevent confusion between vehicles and so as to avoid a use restriction being incorrectly redefined for the wrong vehicle.

In addition, a communication structure 4 is provided in the vehicle, by which the transmitting device and the receiving device 3 communicate with the use protection control unit 5 and at least one operationally necessary control unit 6. Data buses, for example CAN, VAN or D2B, may serve as the communication structure 4. The transmission of the data via the communication structure may also occur in coded form.

For locating purposes, a locating system 7, such as for example GPS (Global Positioning System), is required in the vehicle. This, too, is connected to the use protection control unit via the communication structure 4 of the vehicle.

In this context, the use protection control unit 5 or the entirety of the control units connected to the communication structure can continuously perform checks of the system integrity, and in case of an attack on the system integrity, they can deactivate at least one operationally necessary control unit and the transmission of locating signals.

FIGS. 2A–2D show a flow chart of a method according to the invention which is particularly suitable for detecting unauthorized use of fleet vehicles, such as taxis, hire vehicles or leased vehicles, referred to below as hire vehicles. For example, exceeding the hire period, or a fixed maximum distance travelled may constitute an unauthorized use. Similarly, violation of restrictions to certain regions or a prohibition on taking the vehicle into specific regions may also constitute an unauthorized use in contravention of the contract. The possibilities of unauthorized use are therefore more diverse than in the case of privately owned vehicles. In addition, the leasing agent must be able to react flexibly to the wishes of his customer and be easily able to make continued use of the vehicle possible, even at a later time.

Figure 2A:
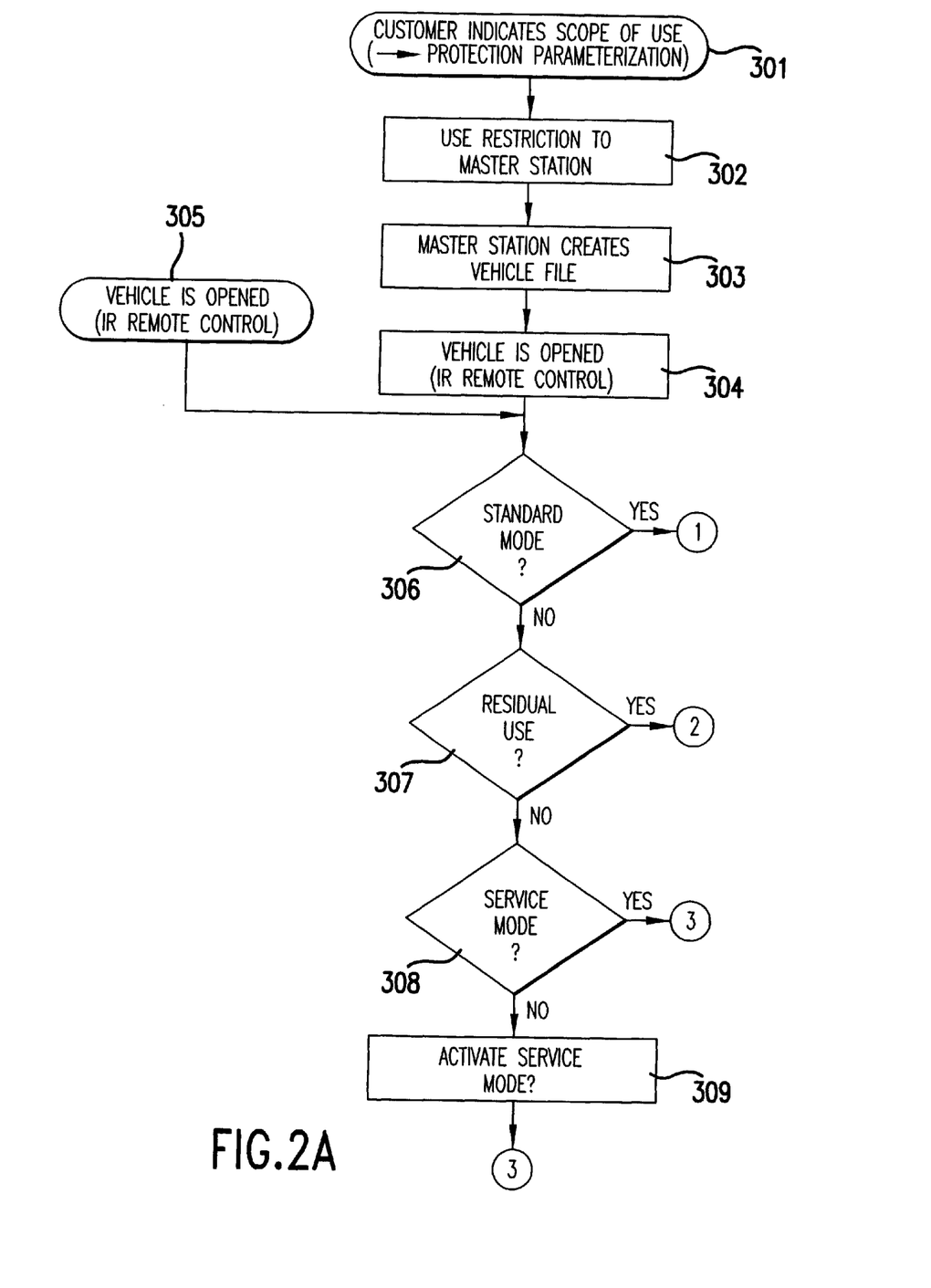
FIGS. 2A–2D show a flow chart of a method for protecting fleet vehicles, such as hire vehicles, against unauthorized use according to the invention.

In the case of hire vehicles, according to step 301 in FIG. 2A, before each individual hiring of a vehicle an agreement is made between the leasing agent and the hiring party relating to the use of the vehicle. In step 302, the leasing agent communicates the agreed use of the vehicle to the master station, which stores these data in a file assigned to this vehicle, and monitor compliance therewith. Monitoring of the use restriction can thus be carried out both in vehicle and in the master station. The invention is described below with reference to a method of monitoring the use restriction in the vehicle itself, a communication between the master station and the vehicle being required only if either the use restriction has been transgressed or the use restriction stored in the vehicle has been changed.

A change may be in this context either a narrowing or an extension of the use restriction.

Alternatively, it is also possible for the monitoring of the use restriction to be carried out in the master station. Then, a status signal, which contains, in addition to the vehicle identification, all the variables which are subject to a use restriction and are measured or determined in the vehicle, would have to be transmitted to the master station from the vehicle as a function of specific criteria (for example once every 2 hours of operation, whenever the vehicle is activated, every 200 km driven or at least 3 times daily). The master station then replies to the status signal with an enabling signal if a transgression of the use authorization has not been determined. If the vehicle does not receive the enabling signal, it goes initially into the residual use mode and, when the further use of the vehicle which is tolerated during the residual use has expired, the vehicle is deactivated by disabling at least one operationally necessary control unit.

Figure 2B:
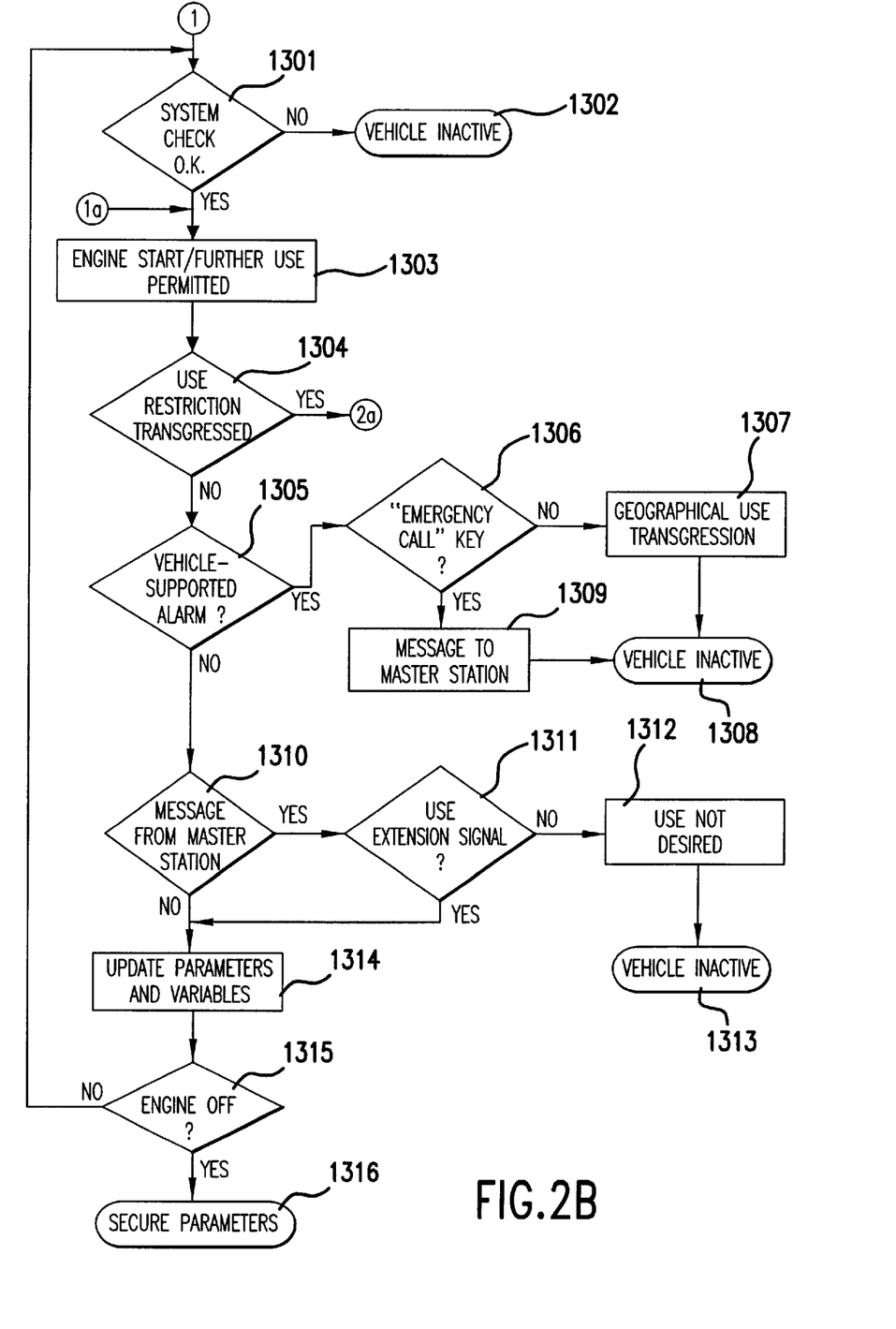
Figure 2C:
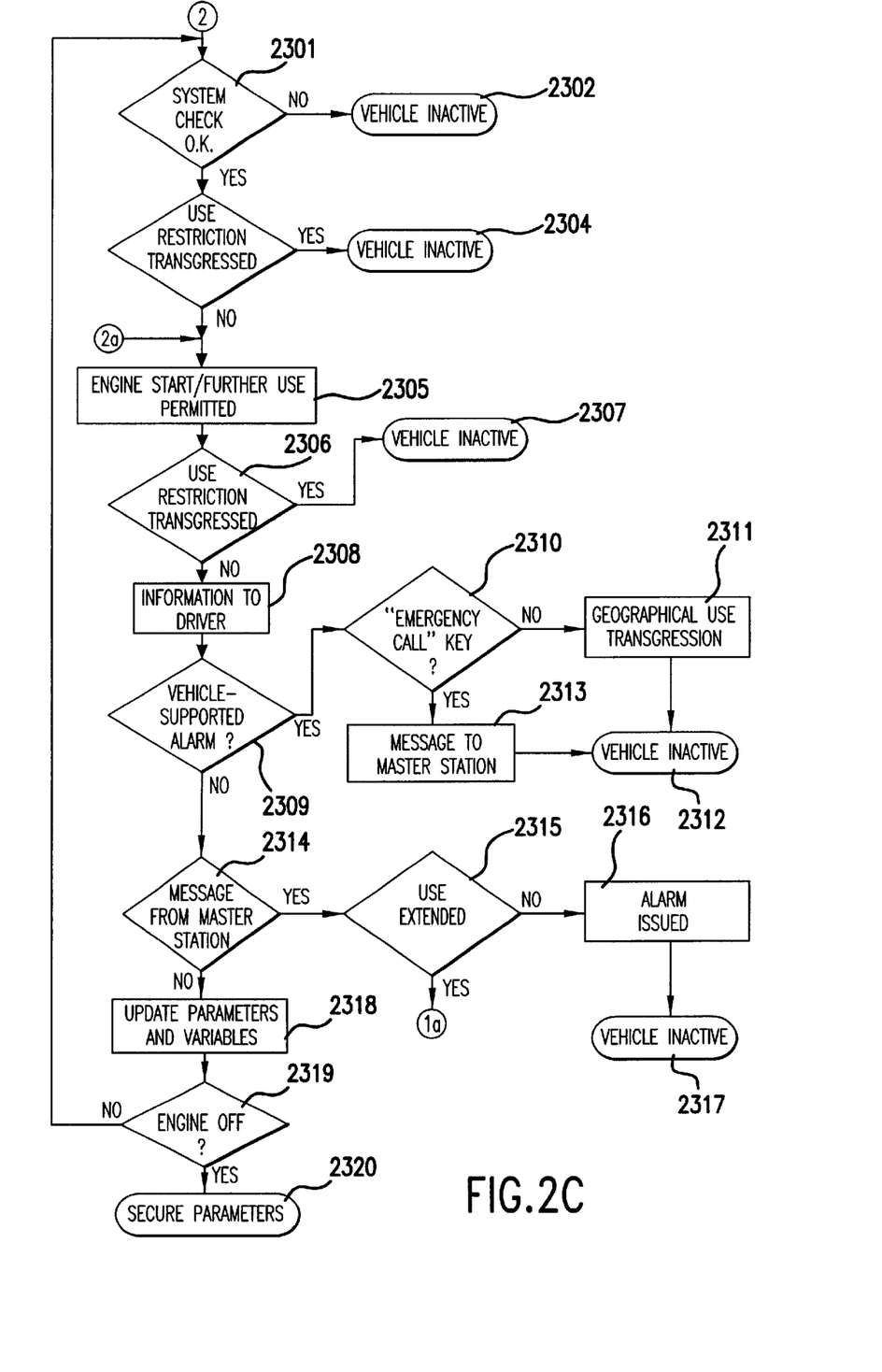
Figure 2D:
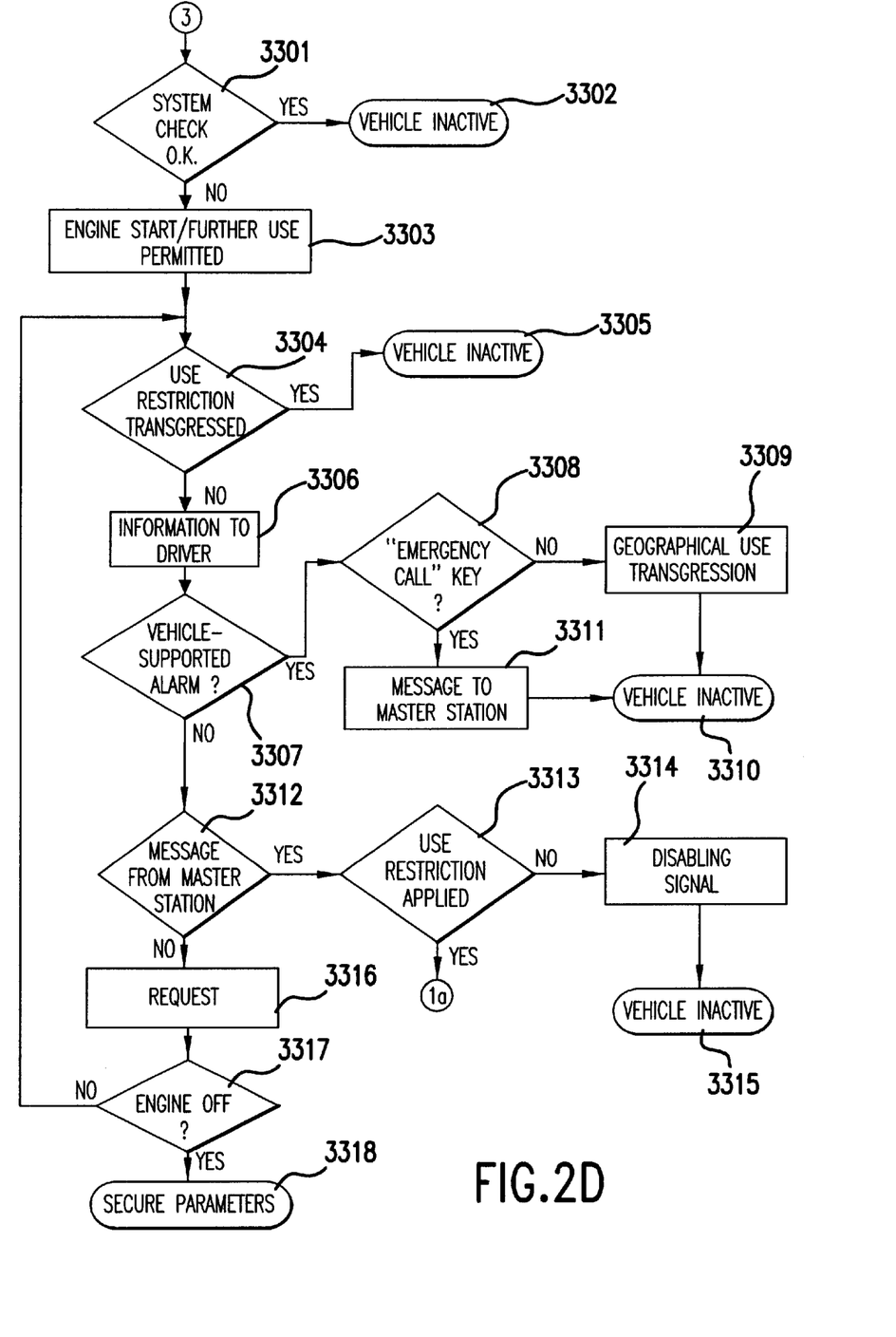

When the vehicle is opened with the key in step 304 or 305, it is determined whether a standard use of the vehicle is taking place in step 306. (Standard use exists if no use outside the use agreement has yet been determined.) If a standard use is taking place, the system jumps to step 1301 (FIG. 2B). Otherwise, it is interrogated in step 307 whether a residual use of the vehicle is taking place. A residual use of the vehicle occurs if a use beyond the terms of the use agreement has been determined, but, before the vehicle is deactivated, the person hiring the vehicle is to be given time and opportunity to come to an agreement with the hiring agent for an extension of use. If a residual use is taking place, the system jumps to step 2301 (FIG. 2C). Otherwise, in step 308 it is checked whether the service mode is activated, in which it is possible to operate the vehicle for the necessary vehicle movements, for example for maneuvering, making ready, parking and servicing the vehicle. The service mode cannot be activated as long as a use of the vehicle is registered at the master station. In addition, it permits only a very restricted operation, for example within a strictly limited geographical area or only over a distance of several kilometers. If the service mode has already been activated, the system jumps to step 3301 (FIG. 2D). Otherwise, the service mode is activated first and then the system jumps to step 3301.

Steps 1301 to 1316 (FIG. 2B) comprise the checking, as carried out in the standard mode. In step 1301, a system check is carried out. Here, it is checked for example whether the integrity of the system has been violated. If so, the system jumps to step 1302, and the vehicle is prevented from being operated by deactivation of at least one operationally necessary control unit. A locating signal may be broadcast.

If it has been detected in step 1301 that the system at the vehicle end is operating satisfactorily, in step 1303 the vehicle is activated or its further use is permitted. In step 1304 it is checked whether the use restriction has been violated. If so, processing advances to step 2305, and residual use of the vehicle is activated. Since the steps 1305 to 1309, 2309 to 2313 and 3307 to 3311 correspond to one another, they are described only once with reference to steps 1305–1309.

If a violation of a use restriction is not detected in step 1304, it is determined in step 1305 whether a vehicle-supported alarm has been issued. A vehicle-supported alarm has been issued if, for example, it is determined that a switching device, provided for this purpose, has been intentionally actuated by an occupant of the vehicle or the geographical use restriction has been violated.

If a vehicle-supported alarm has not been issued, a corresponding message is transmitted to the master station by the vehicle in step 1309. A locating signal can be transmitted from the vehicle to the master station at the same time as the message. The broadcasting of this message cannot be detected by the occupants of the vehicle. This procedure makes it possible, for example, for the driver easily to summon help in the event of a breakdown or in the case of accidents. If appropriate, a voice connection between the driver and the master station can also be established automatically. Actuation of the switching device ("emergency switch") can also result in a jump to step 1308 if deactivation of the vehicle is desired after the transmission of the message to the master station. Otherwise, it is checked in step 1307 whether the vehicle has left a specific geographical area or entered a specific geographical area which is excluded from use. If so, in accordance with step 1308 the activation of the vehicle, after the next deactivation, is prevented in that, at least then, at least one operationally necessary control unit is deactivated.

Alternatively, operation of the vehicle can be progressively terminated in that for example the driving capabilities of the vehicle are progressively reduced by means of the engine control and/or, if appropriate, the gearbox control until the vehicle slowly comes to a standstill. When the vehicle is at a standstill, at least one operationally necessary control unit (engine control, gearbox control) can then be deactivated, so that the vehicle is disabled. This prevents the vehicle's continuing to be moved further during a relatively long period of time after it has been determined that further operation of the vehicle is no longer desired. When the disabling signal is received, a current locating signal can be additionally broadcast periodically in a fixed chronological sequence. The chronologically fixed sequence comprises two locating signals which are transmitted shortly one after the other, for example within less than one minute or even less than 30 seconds, and an adjoining waiting time without the broadcasting of a locating signal. The broadcasting of the locating signal which takes place twice in brief succession is intended to permit the master station to determine not only the current location of the vehicle but also its direction of travel. The minimum chronological interval is downwardly limited here by the resolution of the locating system. The adjoining waiting time is to be selected to be sufficiently short that on the one hand reasonable tracking of the vehicle from the master station is made possible, and on the other hand overloading of the master station by an excessively large data input is avoided.

Thus, in accordance with this example, the transgression of a geographical use restriction is not treated as a more serious transgression than other use restrictions, which results in the immediate deactivation of the vehicle according to one of the methods in accordance with step 1308; and there is no provision for residual use during which an arrangement can be made between the driver and the master station.

Since the steps 1310 to 1313, 2314 to 2317 and 3312 to 3315 correspond to one another, they are only described once with reference to steps 1305–1309. After it has been determined in step 1305 that no vehicle supported alarm has been actuated, it is checked in step 1310 whether a signal broadcast by the master station has been received by the vehicle. If so, in step 1311 it is checked whether the received signal corresponds to a use extension signal. If it does, the system jumps to step 1314. Otherwise, in step 1312 it is determined that a further use of the vehicle is not to take place. In accordance with step 1313 the vehicle is then deactivated, in a way analogous to step 1308.

In step 1314, the current values of the use restriction parameters and the values of variables which are subject to a use restriction are updated, and in step 1315 it is checked whether the vehicle has been deactivated by the driver. If so, in step 1316 the current values of the use restriction parameters and the values of variables which are subject to a use restriction are stored. Otherwise, the system jumps back to step 1301.

The method in accordance with steps 2301 to 2320 (FIG. 2C) corresponds in large measure to the procedure according to steps 1301 to 1316. However, a residual use of the vehicle does take place. During this residual use, although a transgression of the use restriction is taking place, a further use of the vehicle is temporarily tolerated. The vehicle is deactivated only if no extension of the use authorization is carried out during this residual use.

Steps 2301 and 2302 correspond to steps 1301 and 1302 (FIG. 2B). In step 2303 it is checked whether a use restriction has occurred. If so, activation of the vehicle is prevented in step 2304.

Otherwise, in accordance with step 2305 the further operation of the vehicle or the activation of the vehicle is permitted. In step 2306 it is again determined whether a use restriction has been violated. If it has, in step 2307 the vehicle is deactivated in a way analogous to one of the procedures described in step 1308 (FIG. 2B) Otherwise, in accordance with step 2308 the driver is requested, with visual or acoustic means, to enter into communication with the master station. During this process, the remaining residual use before the deactivation of the vehicle may be signalled to the driver. At the same time, a locating signal may also be broadcast.

The procedure adopted in steps 2309 to 2313 is analogous to the procedure in steps 1305 to 1309. The procedure in steps 2314 to 2317 corresponds to the procedure in steps 1310 to 1313, in which case, in contrast with step 1311, if the reception of a use extension signal is determined in step 2315 the system does not jump to step 2318 but instead to step 1303. The reception of a use extension signal means that the vehicle has been enabled for further use from the master station. This takes place if the driver has entered in communication with the master station and an agreement for further use of the vehicle has been arrived at.

In step 2318 the current values of the use restriction parameters and the values of variables which are subject to a use restriction are updated. In step 2319 it is determined whether the vehicle has been deactivated by the driver. If it has, step 2320 the current values of the use restriction parameters and the values of variables which are subject to a use restriction are stored. Otherwise, the system jumps back to step 2301.

Steps 3301 to 3318 constitute the service mode, which is a default mode of operation that is implemented if there is no use of the vehicle registered at the master station. It permits the vehicle to be operated for the purposes of the leasing agent.

In accordance with step 3301, a system check is carried out. Here, it is checked for example whether the integrity of the system has been violated. If so, the system jumps to step 3302, and operation of the vehicle is prevented by deactivating at least one operationally necessary control unit. A locating signal can be broadcast.

If the system integrity has not been violated, in step 3303 activation, or the further operation, of the vehicle is permitted. In step 3304 it is then determined whether a vehicle use restriction has been violated. If it has, in step 3305 the vehicle is deactivated according to one of the procedures described in step 1308.

In accordance with step 3306 a locating signal is broadcast from the vehicle. Information relating to the remaining possible use of the vehicle can be indicated to the driver. Steps 3307 to 3311 correspond to steps 1305 to 1309 (FIG. 2B). Steps 3312 to 3315 correspond to steps 1310 to 1313. In contrast with step 1311, it is interrogated in step 3313 whether a use restriction has been registered in the master station, that is to say whether a possible use of the vehicle has been registered in the master station by the leasing agent. If this is the case, the system jumps to step 1303 (FIG. 2B).

In step 3316, a request for the transmission of a use restriction is sent to the master station, which request is replied to only if appropriate data has been received from the leasing agent at the master station. In step 3317 it is checked whether the vehicle has been deactivated by the driver. If this is the case, in step 3318 the current valus of the use restriction parameters and the values of variables which are subject to a use restriction are stored. Otherwise, the system jumps back to step 3304.

Once a vehicle has been disabled by deactivation of an operationally necessary control unit at the instigation of the use protection control unit, the vehicle can be reactivated, for example, by the transmission of an operation enabling signal from the master station, to the transmitter/receiver on the vehicle, which conveys this signal to the use protection control unit. The use protection control unit tests the signal and if it is determined to be valid, it cancels the deactivation of operationally necessary control units. The vehicle can then be driven again. The broadcasting of the operation enabling signal by the master station takes place for example when an appropriate message from an authority or the owner of the vehicle is received at the master station.

Alternatively or additionally it can be provided that the vehicle can be reactivated only if a code, which is determined to be valid by the use protection control unit, is entered via a data input interface which is connected to the said unit. In this context, it is advantageous if the number of units which generate an appropriate code is small and they are subject to monitoring by the master station.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for protecting against unauthorized use of a vehicle having a receiving device, a communication structure for exchange of data between at least the receiving device, a use protection control unit and at least one operationally necessary control unit, the receiving device receiving data broadcast by a stationary master station which is situated at a fixed location, said method comprising the steps of:

use restrictions applicable to the vehicle are established by a controlling authority, prior to operation of the vehicle;

data which contain said use restrictions applicable to the vehicle are stored in the master station in a file assigned to the vehicle;

the master station broadcasts a coded data signal containing coded information identifying said use restrictions applicable to the vehicle;

the receiving device receives said coded data signal, including said coded information identifying said use restrictions;

the use protection control unit checks for the transgression of a use restriction contained in said data signal received by said receiving device; and if the violation of a use restriction occurs, at the least one operationally necessary control unit is deactivated.

2. A method for protecting against unauthorized use of a vehicle having a transmitting and receiving device, a communication structure for exchange of data between at least the transmitting and receiving device, a use protection control unit and at least one operationally necessary control unit, the transmitting and receiving device transmitting data to, and receiving data broadcast by, a master station situated at a fixed location remote from the vehicle, said method comprising the steps of:

use restrictions applicable to the vehicle are established by a controlling authority prior to operation of the vehicle;

data which contain said use restrictions are stored in the master station in station in a file assigned to the vehicle;

in accordance with set reporting criteria, the use protection control unit broadcasts a status signal via the transmitting and receiving device, said status signal including current values of vehicle operation variables which are subject to at least one of said use restrictions;

after reception of the status signal, the master station checks at least the vehicle operating variables based on the current values transmitted from the vehicle to determine if a violation of a use restriction has occurred; and the master station broadcasts data which contain an enabling signal only if a violation of a use restriction has not occurred.

3. The method according to claim 1 wherein the transmitting device and the receiving device are combined in a mobile communication system.

4. The method according to claim 1 wherein:
a function check at least of the communication structure, the transmitting device, the receiving device and the use protection control unit is carried out; and
a detected degradation of the system integrity is evaluated as violation of a use restriction.

5. The method according to claim 1 wherein after violation of a use restriction, further operation of the vehicle is permitted for a residual use.

6. The method according to claim 5 wherein during residual use of the vehicle, a driver of the vehicle is requested to establish a connection to the master station.

7. The method according to claim 5 wherein during residual use of the vehicle, a connection is established between a driver of the vehicle and master station.

8. The method according to claim 1 further comprising the steps of:
if no use restrictions are signalled to the master station or to the vehicle, activating a service mode; and
prescribing a specific use restriction from among possible use restrictions during the service mode, it being impossible for the use restriction to be renewed or extended, and only brief operation of the vehicle being made possible.

9. The method according to claim 1 further comprising the steps of:
determining a current location of the vehicle by means of a locating system in the vehicle; and
at least when a use restriction is violated, broadcasting a locating signal which represents the current location via the transmitting device.

10. The method according to claim 9 wherein a locating signal is continuously broadcast while the vehicle is operating in a service mode.

11. The method according to claim 9 wherein, when a residual use is taking place, current locating signals are periodically broadcast in a fixed chronological sequence.

12. The method according to claim 1 wherein a violation of the use restriction comprises exceeding a prescribed time interval which is independent of the use of the vehicle.

13. The method according to claim 1 wherein a violation of the use restriction comprises exceeding a prescribed operating period.

14. The method according to claim 1 wherein a violation of the use restriction comprises exceeding a prescribed maximum distance travelled.

15. The method according to claim 1 wherein a violation of the use restriction comprises exceeding a prescribed number of activations of the vehicle.

16. The method according to claim 1 wherein a violation of the use restriction comprises leaving or entering a specific geographical area.

17. The method according to claim 1 further comprising the steps of:
when the vehicle is activated, it is checked whether a disabling signal has been received from the master station; and
if a disabling signal has been received, the activation of the vehicle is prevented by deactivation of at least one operationally necessary control unit.

18. The method according to claim 17 further comprising the steps of:
after reception of a disabling signal, a vehicle-locating process is performed; and
a locating signal is broadcast at least once.

19. The method according to claim 1 further comprising the steps of:
after a violation of a use restriction, the reactivation of the vehicle is made possible by use extension signals broadcast by the master station, terminating the deactivation of the at least one operationally necessary control unit; and
the use restriction of the vehicle is extended at the same time.

20. The method according to claim 1 further comprising:
if the vehicle receives an operation enabling signal broadcast by the master station, deactivation of the at least one operationally necessary control unit is cancelled by the use protection control unit via the communication structure.

21. The method according to claim 1 wherein a data input interface which is connected to the use protection control unit is arranged at the vehicle end, at least the inputting of a code, which has been detected as valid, via the data input interface being required in order to reactivate the at least one operationally necessary control unit.

22. The method according to claim 1, wherein:
said master station broadcasts signals containing respective use restrictions applicable to a plurality of vehicles; and
said signals broadcast by the master station include a vehicle specific identification information for a vehicle whose use restrictions are contained in said signals.

23. The method according to claim 1, wherein use of the vehicle is enabled only if a bidirectional communication takes place between the master station and the vehicle prior to an operation of the vehicle, and at a later time also.

24. The method according to claim 2, wherein:
said status signal is broadcast by said use protection control unit at times determined according to predetermined criteria;
operation of the vehicle is possible only when said enabling signal is received from said master station in response to said status signal; and
absence of receipt of a responsive enabling signal causes deactivation of the at least one operationally necessary control unit.

* * * * *